US012801079B2

(12) United States Patent
Kezuka et al.

(10) Patent No.: US 12,801,079 B2
(45) Date of Patent: Nov. 17, 2026

(54) IMAGE FORMING APPARATUS AND PROCESS CARTRIDGE

(71) Applicants: Shogo Kezuka, Kanagawa (JP); Akihiro Kawasaki, Kanagawa (JP); Shuichi Nakagawa, Kanagawa (JP); Yutaro Kaku, Kanagawa (JP); Yasuhide Matsuno, Kanagawa (JP); Hiroaki Kato, Kanagawa (JP); Taira Otsuka, Kanagawa (JP)

(72) Inventors: Shogo Kezuka, Kanagawa (JP); Akihiro Kawasaki, Kanagawa (JP); Shuichi Nakagawa, Kanagawa (JP); Yutaro Kaku, Kanagawa (JP); Yasuhide Matsuno, Kanagawa (JP); Hiroaki Kato, Kanagawa (JP); Taira Otsuka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/083,522

(22) Filed: Mar. 19, 2025

(65) Prior Publication Data

US 2025/0315004 A1 Oct. 9, 2025

(30) Foreign Application Priority Data

Apr. 4, 2024 (JP) ................................ 2024-060505

(51) Int. Cl.
*G03G 15/08* (2006.01)
*G03G 21/00* (2006.01)
*G03G 21/18* (2006.01)

(52) U.S. Cl.
CPC ..... *G03G 21/0064* (2013.01); *G03G 15/0808* (2013.01); *G03G 15/0812* (2013.01);
(Continued)

(58) Field of Classification Search
CPC ........... G03G 15/0808; G03G 15/0812; G03G 15/0887; G03G 15/0889; G03G 21/0064;
(Continued)

(56) References Cited

U.S. PATENT DOCUMENTS

2008/0069599 A1 3/2008 Nakamura et al.
2009/0169270 A1 7/2009 Fuwa et al.
(Continued)

FOREIGN PATENT DOCUMENTS

JP 2001-066896 A 3/2001
JP 2007-248921 A 9/2007
(Continued)

*Primary Examiner* — Sophia S Chen
(74) *Attorney, Agent, or Firm* — XSENSUS LLP

(57) ABSTRACT

An image forming apparatus includes a photoconductor; a charging device to charge a first surface of the photoconductor; and a developing device including a developing roller to: rotate in one direction while contacting the first surface of the photoconductor; and develop a latent image of toner on the first surface of the photoconductor; and collect the toner adhered to the first surface of the photoconductor; and a supply roller to: rotate in the one direction while contacting a second surface of the developing roller; supply the toner in the developing device to the second surface of the developing roller; and collect foreign matter adhered to the second surface of the developing roller, the foreign matter moved from the first surface of the photoconductor to the second surface of the developing roller.

15 Claims, 3 Drawing Sheets

(52) U.S. Cl.
CPC ..... *G03G 15/0889* (2013.01); *G03G 21/1814* (2013.01); *G03G 2215/085* (2013.01); *G03G 2221/0042* (2013.01)

(58) Field of Classification Search
CPC ......... G03G 21/1814; G03G 2215/085; G03G 2221/0042
See application file for complete search history.

(56) References Cited

U.S. PATENT DOCUMENTS

| | | | | |
|---|---|---|---|---|
| 2011/0243616 | A1 | 10/2011 | Nakagawa et al. | |
| 2012/0045254 | A1 | 2/2012 | Inoue et al. | |
| 2012/0134697 | A1* | 5/2012 | Kawashima | G03G 15/0808 399/284 |
| 2013/0136508 | A1 | 5/2013 | Nakagawa | |
| 2013/0236217 | A1 | 9/2013 | Nagatomo et al. | |
| 2015/0055987 | A1 | 2/2015 | Sakagawa et al. | |
| 2015/0117901 | A1 | 4/2015 | Kichise et al. | |
| 2015/0253691 | A1* | 9/2015 | Mitsui | G03G 15/0812 399/284 |
| 2017/0146925 | A1 | 5/2017 | Tsuji et al. | |
| 2017/0176886 | A1 | 6/2017 | Nagatomo et al. | |
| 2021/0373461 | A1* | 12/2021 | Watanabe | G03G 21/0064 |
| 2025/0251693 | A1* | 8/2025 | Otsuka | G03G 21/1676 |

FOREIGN PATENT DOCUMENTS

| | | | |
|---|---|---|---|
| JP | 2008-070671 | A | 3/2008 |
| JP | 2009-014981 | A | 1/2009 |
| JP | 2016-050956 | A | 4/2016 |
| JP | 2021-189333 | A | 12/2021 |
| JP | 2023-075865 | A | 5/2023 |

* cited by examiner

IMAGE FORMING APPARATUS AND PROCESS CARTRIDGE

CROSS-REFERENCE TO RELATED APPLICATIONS

This patent application is based on and claims priority pursuant to 35 U.S.C. § 119(a) to Japanese Patent Application No. 2024-060505, filed on Apr. 4, 2024, in the Japan Patent Office, the entire disclosure of which is hereby incorporated by reference herein.

BACKGROUND

Technical Field

The present disclosure relates to an image forming apparatus such as a copying machine, a printer, a facsimile, or a multifunction peripheral of a copying machine, a printer, and a facsimile, and a process cartridge installed in the copying machine, the printer, the facsimile, or the multifunction peripheral.

Related Art

Some image forming apparatuses such as copying machines and printers are of a cleaner-less type in which a cleaning device for cleaning untransferred toner adhered to a surface of a photoconductor (photoconductor drum) is not installed. In such a cleaner-less type image forming apparatus, a developing device collects untransferred toner adhered to the surface of the photoconductor, that is, the developing device functions as a cleaning device.

There is a technique in which, in a developing device installed in a cleaner-less type image forming apparatus, a developing roller and a supply roller rotate and move in an identical direction at a contact portion for purposes of preventing occurrence of such a problem that foreign matter such as paper dust is caught between the developing roller and a regulating member (doctor blade).

SUMMARY

The present disclosure described herein provides an image forming apparatus including a photoconductor; a charging device to charge a first surface of the photoconductor; and a developing device including a developing roller to: rotate in one direction while contacting the first surface of the photoconductor; and develop a latent image of toner on the first surface of the photoconductor; and collect the toner adhered to the first surface of the photoconductor; and a supply roller to: rotate in said one direction while contacting a second surface of the developing roller; supply the toner in the developing device to the second surface of the developing roller; and collect foreign matter adhered to the second surface of the developing roller, the foreign matter moved from the first surface of the photoconductor to the second surface of the developing roller.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
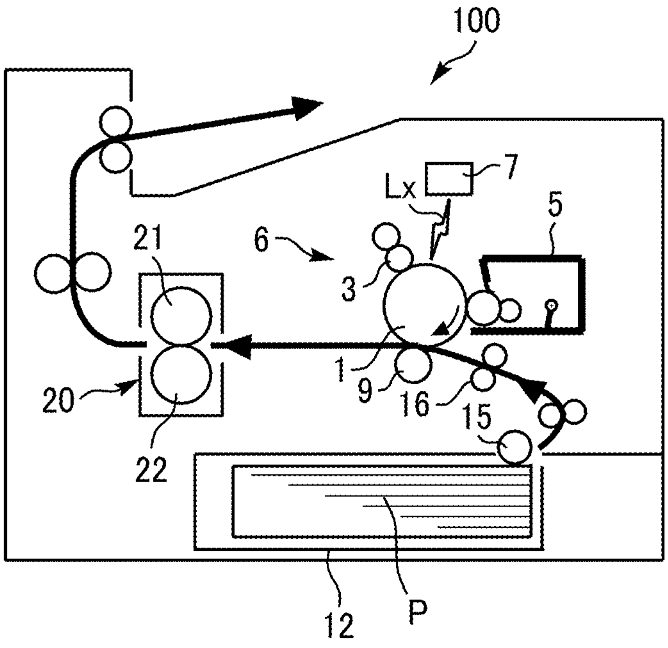
FIG. 1 is a general arrangement diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail with reference to drawings. Note that identical parts are given identical reference numerals and redundant descriptions are summarized or omitted accordingly.

An overall configuration and operation of an image forming apparatus 100 will now be described herein with reference to FIGS. 1 and 2.

In FIG. 1, an image forming apparatus 100 serving as a printer. A photoconductor drum 1 serves as a photoconductor having a surface on which a toner image is to be formed. A process cartridge 6 includes the photoconductor drum 1, a charging roller 3, and a developing device 5 integrated with each other. An exposure device 7 (writing device) allows the photoconductor drum 1 to be irradiated with exposure light Lx based on image information inputted from an input device such as a personal computer.

A transfer roller 9 transfers the toner image carried on the surface of the photoconductor drum 1 to a sheet P conveyed to a transfer nipper (transfer position), and a sheet feeding device 12 (sheet feeding cassette) stores the sheets P such as sheets of paper.

A registration roller 16 (timing roller) conveys the sheet P toward the transfer nipper where the photoconductor drum 1 and the transfer roller 9 abut with each other, and a fixing device 20 fixes an unfixed image on the sheet P.

The charging roller 3 and the developing device 5 are disposed around the photoconductor drum 1.

These members (the photoconductor drum 1, the charging roller 3, and the developing device 5) are integrated with each other to serve as the process cartridge 6, and are detachably (replaceably) installed in a main body of the image forming apparatus 100. When a predetermined replacement cycle is reached, when maintenance is to be performed, or the like, the process cartridge 6 is taken out from the main body of the image forming apparatus 100 and replaced with a new one (or undergoes maintenance).

Operation of the image forming apparatus 100 during normal image formation will now be described herein with reference to FIGS. 1 and 2.

When image information is transmitted from the input device such as a personal computer to the exposure device 7 in the image forming apparatus 100, the exposure light Lx (laser light) based on the image information is emitted from the exposure device 7 toward the surface of the photoconductor drum 1.

The photoconductor drum 1 is driven by a drive motor installed in the main body of the image forming apparatus 100 and rotates in an arrow direction (clockwise direction). The surface of the photoconductor drum 1 is uniformly charged at a contact position with the charging roller 3 (charging step). In this way, a charging potential (approximately −1100 V) is formed on the photoconductor drum 1. The toner (untransferred toner) adhered to the charging roller 3 is removed by a cleaning roller 4 that comes into contact with the charging roller 3.

After that, the charged surface of the photoconductor drum 1 reaches an irradiation position of the exposure light Lx. A potential at a portion irradiated with the exposure light Lx reaches a latent image potential (ranging from approximately 0 V to −100 V), and an electrostatic latent image is formed on the surface of the photoconductor drum 1 (exposure step).

After that, the surface of the photoconductor drum 1 on which the electrostatic latent image is formed reaches a position opposed to the developing device 5. The toner is supplied from the developing device 5 onto the photoconductor drum 1, and the latent image on the photoconductor drum 1 is developed to form a toner image (developing step).

After that, the surface of the photoconductor drum 1 after the development step reaches the transfer nipper (transfer position) with the transfer roller 9. At the transfer nipper with the transfer roller 9, a transfer bias (bias having a polarity different from a polarity of the toner) is applied from a power supply to the transfer roller 9, allowing the toner image formed on the photoconductor drum 1 to be transferred onto the sheet P conveyed by the registration roller 16 (transfer step).

The surface of the photoconductor drum 1 after the transfer step reaches a position opposed to a neutralizing device 2, and the residual potential is neutralized by neutralizing light Lz emitted from the neutralizing device 2.

After that, the surface of the photoconductor drum 1 passes through the position of the charging roller 3 and reaches a position opposed to the developing device 5. The developing device 5 collects the toner (untransferred toner) remaining on the photoconductor drum 1 (cleaning process). As described above, the developing device 5 according to the present embodiment is configured to be able to collect the toner remaining on the surface of the photoconductor drum 1 (photoconductor). That is, the image forming apparatus 100 according to the present embodiment employs a cleaner-less type.

In this way, a series of steps of an image formation process on the photoconductor drum 1 is completed.

Operation for the sheet P conveyed to the transfer nipper between the photoconductor drum 1 and the transfer roller 9 is as described below.

Uppermost one of the sheets P stored in the sheet feeding device 12 is fed toward a conveyance path by a sheet feeding roller 15.

After that, the sheet P reaches a position of the registration roller 16. The sheet P that has reached the position of the registration roller 16 is conveyed toward the transfer nipper (abutting position between the transfer roller 9 and the photoconductor drum 1) in accordance with a timing for positioning with the image formed on the photoconductor drum 1.

The sheet P after the transfer step passes through the position of the transfer nipper (transfer roller 9), and reaches the fixing device 20 via the conveyance path. The sheet P that has reached the fixing device 20 is fed between a fixing roller 21 and a pressure roller 22, and the image is fixed by heat received from the fixing roller 21 and pressure received from both the fixing roller 21 and the pressure roller 22. The sheet P on which the image is fixed is sent out from between the fixing roller 21 and the pressure roller 22 (fixing nip portion), discharged from the main body of the image forming apparatus 100, and placed on a sheet discharge tray.

In this way, a series of steps of the image formation process is completed.

Next, the process cartridge 6 in the image forming apparatus 100 will now be described herein in more detail with reference to FIG. 2.

Figure 2:
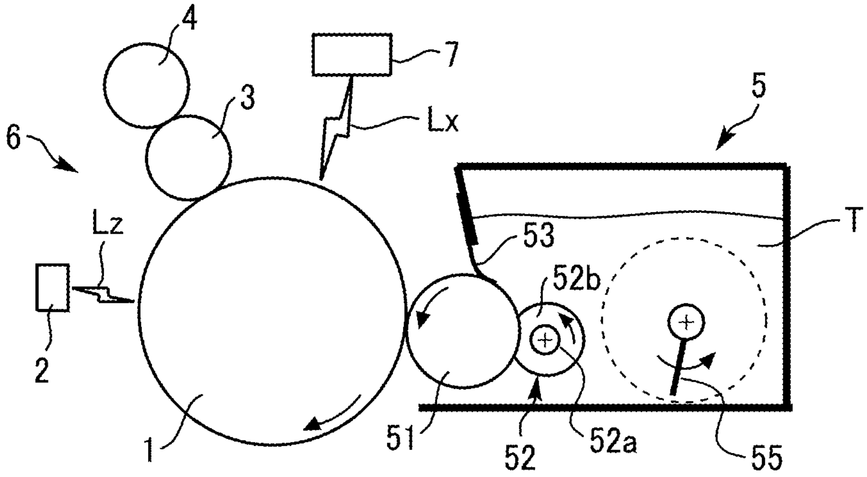
FIG. 2 is a configuration diagram illustrating a process cartridge.

As illustrated in FIG. 2, in the process cartridge 6, mainly, the photoconductor drum 1 serving as a photoconductor, the charging roller 3 serving as a charging device, the cleaning roller 4 serving as a cleaning member that cleans a surface of the charging roller 3, and the developing device 5 are integrally accommodated in a case.

As described above, an image former according to the present embodiment is a cleaner-less type image former, and no dedicated cleaning device (cleaning blade) for cleaning untransferred toner (residual toner) on the photoconductor drum 1 is installed, and the developing device 5 functions as a cleaning device.

The photoconductor drum 1 serving as a photoconductor is an organic photoconductor having a negative electrostatic property, in which a photoconductive layer or the like is provided on a support having a drum shape and having conductivity. The photoconductor drum 1 is rotated and driven in the arrow direction (clockwise direction) in FIG. 2 by the drive motor.

The charging roller 3 serving as a charging device is a roller member formed by covering an outer periphery of a cored bar having conductivity with an elastic layer having resistivity at a medium level. A predetermined charging bias is applied to the charging roller 3 from a charging power supply, uniformly charging the surface of the opposing photoconductor drum 1. The charging roller 3 (charging device) according to the present embodiment is configured to come into contact with the surface of the photoconductor drum 1 (photoconductor). That is, the image forming apparatus 100 according to the present embodiment employs a contact charging type.

The cleaning roller 4, where nylon brush bristles, for example, are circumferentially provided on a cored bar, functions as a cleaning member that comes into contact with the surface of the charging roller 3. To improve ability of cleaning by the cleaning roller 4 in the present embodiment, a predetermined cleaning bias is applied from a cleaning power supply to the cleaning roller 4, causing the toner to be electrostatically transferred from the charging roller 3 toward the cleaning roller 4.

Figure 4:
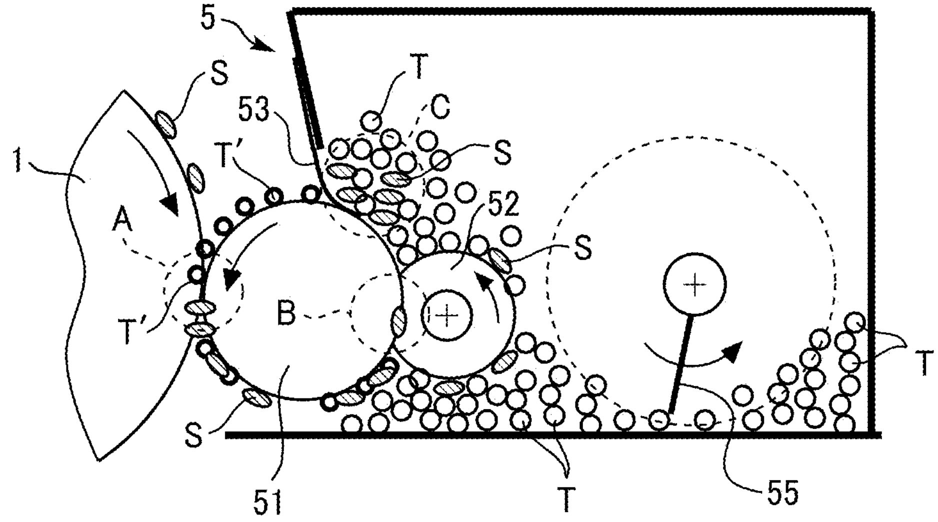
FIG. 4 is a diagram illustrating a state in which paper dust moves from a photoconductor drum into a developing device.

As illustrated in FIGS. 2 and 4, the developing device 5 is mainly disposed to allow a developing roller 51 serving as a developer bearing member to come into contact with the photoconductor drum 1 at a predetermined pressure contact force. The toner (non-magnetic or magnetic single-component developer) is accommodated in the developing device 5. An electrostatic latent image formed on the surface of the photoconductor drum 1 is developed (toner image is formed) by an electric field (developing electric field) formed between the developing roller 51 and the photoconductor drum 1 (developing region).

The electric field in the developing region is formed by a predetermined developing bias applied to the developing roller 51 by a developing power supply and a surface potential (latent image potential) formed on the surface of the photoconductor drum 1 through the charging step and the exposure step.

A configuration and operation of the developing device 5 will now be described herein in more detail.

Referring to FIGS. 2 and 4, the developing device 5 according to the present embodiment is a developing device of a contact single-component developing type, and is installed as a component member of the process cartridge 6 so as to be detachable (replaceably) from the main body of the image forming apparatus 100.

As illustrated in FIGS. 2 and 4, the developing device 5 includes the developing roller 51 serving as a developer bearing member, a supply roller 52 serving as a supply rotating member, a doctor blade 53 serving as a developer regulator, an agitator 55 serving as a stirring member, and the like.

The developing roller 51 carries toner T (developer) on its surface, rotates in a predetermined rotation direction (counterclockwise direction in FIG. 2), and supplies the toner T to an electrostatic latent image formed on the photoconductor drum 1. In the present embodiment, the developing roller 51 is disposed to abut the photoconductor drum 1.

As the developing roller 51, it is possible to use one including a metal material having conductivity such as stainless steel and provided with an elastic layer including an elastic material having conductivity on a cored bar.

The supply roller 52 abuts the developing roller 51.

The supply roller 52 rotates in an identical direction to the rotation direction of the developing roller 51 (counterclockwise direction in FIG. 2) to supply the toner T to the surface of the developing roller 51. That is, the supply roller 52 is a roller member that supplies the toner T to the developing roller 51 while rotating in the counter direction with respect to the rotation direction of the developing roller 51.

The supply roller 52 has a shaft 52*a* (cored bar) formed with a foamed layer 52*b* (having an electric resistance value ranging from approximately $10^3$ Ω to $10^{14}$ Ω) including foamed polyurethane having conductivity or the like.

The supply roller 52 is formed to be able to remove foreign matter such as paper dust adhered to the surface of the developing roller 51, which will be described later in detail.

Gears are installed on each shaft among the developing roller 51, the supply roller 52, and the agitator 55, and the gears are configured to mesh with each other. A driving force is inputted from the driving motor to a train of these gears, and the developing roller 51 and the supply roller 52 are rotated and driven in the arrow directions illustrated in FIGS. 2 and 4, respectively.

The doctor blade 53 (developer regulator) is a member having a thin plate shape including a metal material such as stainless steel, and abuts the developing roller 51 on a downstream side of the supply roller 52 and on an upstream side of the developing region.

The doctor blade 53 regulates an amount of the toner on the developing roller 51 to an appropriate amount. That is, the amount of the toner (toner layer) supplied from the supply roller 52 onto the developing roller 51 is thinned at a position of the doctor blade 53.

The agitator 55 serving as a stirring member is provided with a stirrer that has flexibility, which has a substantially rectangular shape, and that includes Mylar or the like on a rotation shaft.

The agitator 55 is used to stir and convey the toner T accommodated in the developing device 5.

The developing device 5 configured as described above operates as described below during the normal developing step.

Some of the toner T accommodated in the developing device 5 is pumped up (carried) onto the supply roller 52. The toner T carried onto the supply roller 52 is supplied onto the developing roller 51 in a frictionally charged state.

After that, toner T' (in the frictionally charged state) carried onto the developing roller 51 is thinned by the doctor blade 53, reaching a position opposed to the photoconductor drum 1 (developing region). At this position, the toner T' is adsorbed to the electrostatic latent image formed on the photoconductor drum 1 by the electric field (developing electric field) formed in the development region. In this way, a desired toner image (image) is formed on the photoconductor drum 1.

At this time, the toner T for collection (untransferred toner), which has been carried onto the photoconductor drum 1, is collected onto the developing roller 51. That is, the surface of the developing roller 51 after passing through the developing region carries the untransferred toner T carried onto the photoconductor drum 1 and the toner T' (undeveloped toner) that has not moved onto the photoconductor drum 1 in the developing step. The toner T and the toner T' carried onto the developing roller 51 are returned into the developing device 5.

In the present embodiment, non-magnetic toner having a degree of circularity of approximately 0.932 is used as toner (developer) accommodated in the developing device 5. As the toner, it is possible to use non-spherical ground toner or polymerization toner. In the present embodiment, toner having a negative polarity is used.

A predetermined voltage is applied from the power supply to the developing roller 51, the supply roller 52, and the doctor blade 53, facilitating an electrostatic movement of the toner on the developing roller 51. In the present embodiment, an alternating voltage (having a rectangular wave having an alternating current (AC) frequency ranging from approximately 500 Hz to 1000 Hz, a peak-to-peak voltage ranging from approximately 500 V to 3000 V, and an application time duty ranging from approximately 30% to 70%) is applied to the developing roller 51 to allow the toner to move in a reciprocating manner between the developing roller 51 and the photoconductor drum 1 in the developing region.

Although, in the present embodiment, the alternating voltage is applied to the developing roller 51, a direct current (DC) voltage ranging from approximately −100 V to −500 V may be applied to the developing roller 51.

In the present embodiment, operation of collecting untransferred toner as described below is performed during printing (during image formation) and when the image forming apparatus 100 is shut down.

During printing (during image formation), a potential difference expands between the charging roller 3 and the photoconductor drum 1, electricity is discharged before charging, and the untransferred toner on the photoconductor drum 1 is negatively charged by the discharged electricity. The untransferred toner that has not yet negatively charged on the photoconductor drum 1, but has remained positively charged adheres to the charging roller 3, and the positively charged toner is collected to the cleaning roller 4 due to a collection bias applied to the cleaning roller 4. The negatively charged toner on the photoconductor drum 1 is collected by the developing device 5 (developing roller 51) due to a developing bias.

When the image forming apparatus 100 is shut down (during operation after completion of printing), the biases applied to the cleaning roller 4 and the charging roller 3 are changed, the toner on the cleaning roller 4 is discharged onto the photoconductor drum 1 via the charging roller 3, and the toner discharged and carried on the photoconductor drum 1 is collected by the developing device 5 (developing roller 51). At this time, the positively charged toner on the photoconductor drum 1 passes through the developing device 5 without being collected by the developing device 5, is negatively charged through discharging of electricity before charging, and is then collected by the developing device 5 (developing roller 51) due to a developing bias.

A characteristic configuration and operation in the image forming apparatus 100 (process cartridge 6) according to the present embodiment will now be described herein in detail.

As described above with reference to FIGS. 2, 4, and the like, the image forming apparatus 100 employs the cleaner-less type. That is, the image forming apparatus 100 is provided with the developing device 5 including the developing roller 51 that develops a latent image formed on the surface of the photoconductor drum 1 serving as a photoconductor to form a toner image and collects the toner T adhered to the surface of the photoconductor drum 1. The developing roller 51 rotates in the predetermined rotation direction (counterclockwise direction illustrated in FIG. 4) in a state of being in contact with the surface of the photoconductor drum 1 (photoconductor).

The supply roller 52 rotates in the rotation direction (counterclockwise direction illustrated in FIG. 4), identically to the developing roller 51, in a state of being in contact with the surface of the developing roller 51.

In the present embodiment, the supply roller 52 supplies the toner T accommodated in the developing device 5 to the surface of the developing roller 51, and collects foreign matter (including at least paper dust S) that has moved from the surface of the photoconductor drum 1 (photoconductor) to the surface of the developing roller 51 and adhered thereto.

Figure 3:
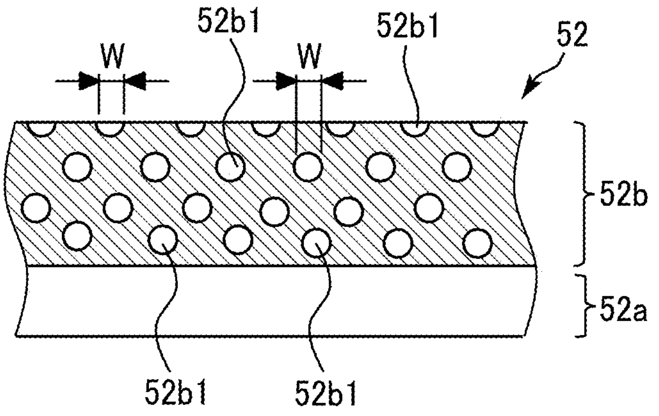
FIG. 3 is a cross-sectional view schematically illustrating in an enlarged manner a part of a supply roller.

Specifically, referring to FIG. 3 and the like, the supply roller 52 has the shaft 52*a* formed with the foamed layer 52*b* including a foamed resin material having a diameter W of each cell of 300 μm or more. In particular, the foamed layer 52*b* includes a foamed resin material having the diameter W of each cell ranging from 300 μm to 700 μm. In the present embodiment, the diameter W of each cell is set to 300 μm.

In the present specification and the like, the "diameter W of each cell" represents an average diameter of a cell 52*b*1 (bubble) in the foamed resin material, and it is possible to obtain a cross-sectional image obtained through cross-sectional observation with a method such as image processing. When the cross section of the cell 52*b*1 is elliptical, the diameter W of each cell is defined as a square root of a product of a major axis and a minor axis.

By setting the diameter W of each cell 52*b*1 in the foamed layer 52*b* in the supply roller 52 to 300 μm or more, the paper dust S (foreign matter) transferred from the photoconductor drum 1 to the developing roller 51 is easily taken into the cell 52*b*1, improving ability of collecting paper dust (ability of collecting foreign matter) of the supply roller 52. When the diameter W of each cell 52*b*1 in the foamed layer 52*b* is larger than 700 μm, the supply roller 52 that supplies the toner T to the developing roller 51 may be deteriorated in ability, and thus setting the diameter W of each cell to range from 300 μm to 700 μm is preferable.

In the present embodiment, in the foamed layer 52*b,* the cells 52*b*1 form continuous bubbles (open cell). That is, the plurality of cells 52*b*1 is formed on an outer peripheral surface of the foamed layer 52*b,* and is configured to come into direct contact with the surface of the developing roller 51.

The supply roller 52 is improved in function of collecting the paper dust S (foreign matter) on the developing roller 51.

In the present embodiment, the supply roller 52 rotates to allow a linear velocity ratio at a portion coming into contact with the developing roller 51 with respect to the developing roller 51 to be 1.0 or more (set number of rotations). In particular, setting the linear velocity ratio to range from 1.0 to 1.5 is preferable. In the present embodiment, the linear velocity ratio is set to 1.2.

By setting the linear velocity ratio of the supply roller 52 with respect to the developing roller 51 to 1.0 or more, it is possible to keep a frictional force between the supply roller 52 and the developing roller 51 high to some extent, making it possible to secure ability of scraping off the paper dust S on the developing roller 51.

Since, when the linear velocity ratio of the supply roller 52 with respect to the developing roller 51 exceeds 1.5, the frictional force between the supply roller 52 and the developing roller 51 becomes excessive, and driving torque increases excessively, setting the linear velocity ratio to range from 1.0 to 1.5 is preferable.

Operation of allowing the paper dust S (foreign matter) to be collected by the developing device 5 according to the present embodiment will now be described herein with reference to FIG. 4.

Since the image forming apparatus 100 according to the present embodiment employs the cleaner-less type, and when the paper dust S of the sheet P adheres to the surface of the photoconductor drum 1 at the transfer nipper, the paper dust S is conveyed as it is to a position A (developing region) representing a position opposed to the developing roller 51 (developing device 5). At the opposing position A, the paper dust S on the photoconductor drum 1 moves onto the developing roller 51.

The paper dust S moved onto the developing roller 51 is collected at a high collection rate by the supply roller 52 in which the diameter W of each cell is set to 300 μm or more and the linear velocity ratio is set to 1.0 or more at a contact portion B with the supply roller 52.

The paper dust S collected by the supply roller 52 is separated from the supply roller 52, scraped off by the doctor blade 53 in a region C after moved again to the developing roller 51, and collected in the developing device 5.

Occurrence of such a problem that the paper dust S (foreign matter) leaks to outside of the developing device 5 as time passes by is suppressed.

Figure 5:
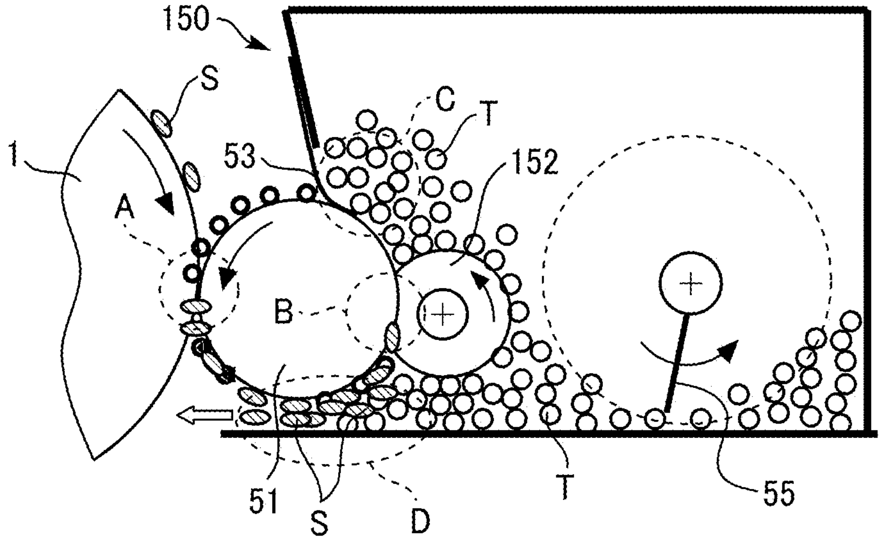
FIG. 5 is a diagram illustrating a state in which paper dust moves from a photoconductor drum into a developing device, according to a comparative example.

When a supply roller 152 having no function of collecting the paper dust S (or the supply roller 152 having a low ability of collecting the paper dust S) is used, similar to a developing device 150 illustrated in FIG. 5 as a comparative example, the paper dust S on the developing roller 51 is scraped off and accumulated below a contact portion between the developing roller 51 and the supply roller 152 (region D) in the developing device 5. As the paper dust S accumulated in the region D as described above increases to some extent as time passes by, the paper dust S leaks to outside of the developing device 5 (as illustrated in a movement in a white arrow direction). In such a case, the leaked paper dust S (foreign matter) may adhere again to the surface of the photoconductor drum 1, or the leaked and scattered paper dust S (foreign matter) may adhere to an optical element or the like of the exposure device 7, leading to an abnormal image.

In the present embodiment, since the supply roller 52 that is high in ability of collecting the paper dust S is used, almost no paper dust S is accumulated below the contact portion (region D) between the developing roller 51 and the supply roller 152, suppressing occurrence of such a problem that the paper dust S leaks from the region D to outside of the developing device 5.

In particular, by optimizing a bias to be applied to each of the developing roller 51, the supply roller 52, and the doctor blade 53 in accordance with a polarity of the paper dust S, it is possible to facilitate a movement of the paper dust S from the photoconductor drum 1 to the supply roller 52 via the developing roller 51, and a movement of the paper dust S from the supply roller 52 to the doctor blade 53 via the developing roller 51.

In the present embodiment, life (replacement cycle) of the developing device 5 (process cartridge 6) is set to be relatively short to prevent a number of sheets to be printed from exceeding 20,000 sheets. Even when the collected paper dust S is accumulated in the region C (around the doctor blade 53), occurrence of such a problem that the accumulated paper dust S adheres to the doctor blade 53 is suppressed.

The inventors of the present application, who have conducted an experiment of confirming a number of printed sheets during which the paper dust S has leaked to outside of the developing device 5 when continuous printing has been performed with the image forming apparatus 100 under four types of conditions described below, have confirmed that the number of printed sheets has increased to 6,000 sheets, 10,000 sheets, 15,000 sheets, and 30,000 sheets in order from Conditions 1 to Conditions 4, and have confirmed improved effects of reducing leakage of the paper dust S.

Conditions 1) Cell **52*b*1**: Single bubble, Diameter of cell: 150 μm, and Linear velocity ratio: 0.7.

Conditions 2) Cell **52*b*1**: Continuous bubbles, Diameter of cell: 200 μm, and Linear velocity ratio: 0.7.

Conditions 3): Cell **52*b*1**: Continuous bubbles, Diameter of cell: 300 μm, and Linear velocity ratio: 0.7.

Conditions 4) Cell **52*b*1**: Continuous bubbles, Diameter of cell: 300 μm, and Linear velocity ratio: 1.2.

Modification

Figure 6:
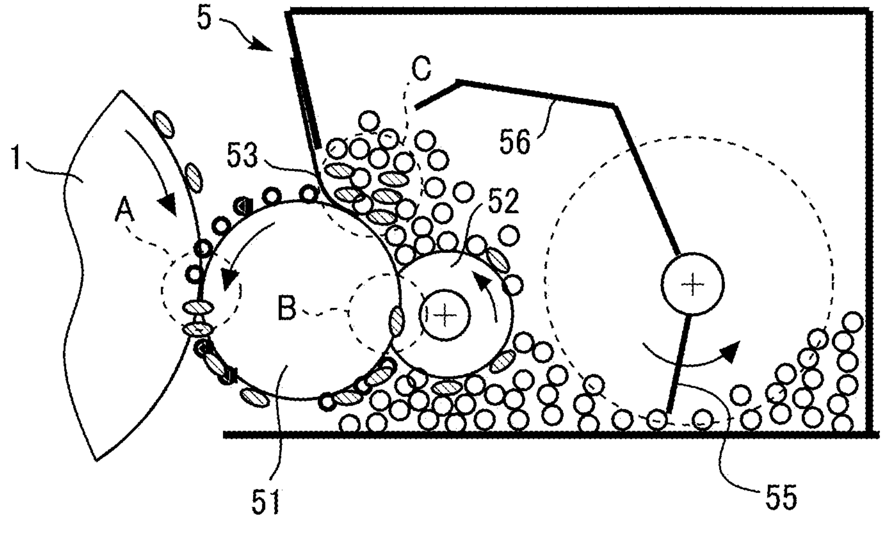
FIG. 6 is a diagram illustrating a developing device according to a modification.

As illustrated in FIG. 6, the developing device 5 according to a modification is provided with a scraper 56 that scrapes out the paper dust S (foreign matter) accumulated around the doctor blade 53 (developer regulator) (region C) toward a position away from the accumulation position (region C).

Specifically, the scraper 56 is installed to the rotation shaft of the agitator 55 (stirring member) that stirs the toner T accommodated in the developing device 5, and rotates in the counterclockwise direction illustrated in FIG. 6 together with the agitator 55.

The scraper 56 includes a resin material having flexibility such as Mylar, and is formed to allow a tip extending from a root held by the rotation shaft of the agitator 55 to reach the region C. The scraper 56, which has undergone a plurality of steps of a bending process (steps of a bending process of bending toward the downstream side in the rotation direction) from the root to the tip, is configured to efficiently scrape the paper dust S accumulated in the region C.

Even when the life (replacement cycle) of the developing device 5 (process cartridge 6) is set to be relatively long, providing the scraper 56 in this manner suppresses accumulation of the collected paper dust S in the region C (around the doctor blade 53), suppressing occurrence of such a problem that the paper dust S adheres to the doctor blade 53.

As described above, the image forming apparatus 100 (process cartridge 6) according to the present embodiment includes the photoconductor drum 1 (photoconductor) and the charging roller 3 (charging device) that charges the surface of the photoconductor drum 1. There is provided the developing device 5 including the developing roller 51 that rotates in the predetermined rotation direction in a state of being in contact with the surface of the photoconductor drum 1 and the supply roller 52 that rotates in the rotation direction in a state of being in contact with the surface of the developing roller 51. The developing roller 51 develops a latent image formed on the surface of the photoconductor drum 1 to form a toner image, and collects the toner adhered to the surface of the photoconductor drum 1. The supply roller 52 supplies the toner accommodated in the developing device 5 to the surface of the developing roller 51, and collects the paper dust S (foreign matter) that has moved from the surface of the photoconductor drum 1 to the surface of the developing roller 51 and adhered thereto.

When the developing device 5 is caused to function as a cleaning device, it is possible to suppress occurrence of such a problem that foreign matter such as the paper dust S leaks to outside of the developing device 5 as time passes by.

An image forming apparatus includes a photoconductor; a charging device to charge a first surface of the photoconductor; and a developing device including: a developing roller to: rotate in one direction while contacting the first surface of the photoconductor; and develop a latent image of toner on the first surface of the photoconductor; and collect the toner adhered to the first surface of the photoconductor; and a supply roller to: rotate in said one direction while contacting a second surface of the developing roller; supply the toner in the developing device to the second surface of the developing roller; and collect foreign matter adhered to the second surface of the developing roller, the foreign matter moved from the first surface of the photoconductor to the second surface of the developing roller.

The supply roller includes: a shaft, a foamed layer on the shaft, the foamed layer comprising a foamed resin material having cells having a diameter of 300 μm or more, and the supply roller rotates at a first linear velocity at a portion contacting the developing roller rotating at a second linear velocity at the portion, and a linear velocity ratio of the first linear velocity to the second linear velocity is 1.0 or more.

The foamed layer includes the cells of continuous bubbles. The cells in the foamed layer have a diameter ranging from 300 μm to 700 μm, and the linear velocity ratio ranges from 1.0 to 1.5. The supply roller collects the foreign matter having at least paper dust from the developing roller. The developing device further includes: a developer regulator to regulate an amount of the toner that is supplied from the supply roller to the developing roller and carried onto the second surface of the developing roller; and a scraper to scrape out the foreign matter accumulated at an accumulation position vicinity of the developer regulator away from the accumulation position. The developing device further includes a stirring member including the scraper to stir the toner in the developing device.

A process cartridge includes a photoconductor; a charging device to charge a first surface of the photoconductor; and a developing device including: a developing roller to: rotate in one direction while contacting the first surface of the photoconductor; and develop a latent image of toner on the first surface of the photoconductor; and collect the toner adhered to the first surface of the photoconductor; and a supply roller to: rotate in said one direction while contacting a second surface of the developing roller; supply the toner in the developing device to the second surface of the developing roller; and collect foreign matter adhered to the second surface of the developing roller, the foreign matter moved from the first surface of the photoconductor to the second surface of the developing roller; and a housing detachably attachable to a main body of an image forming apparatus, the housing accommodating the photoconductor, charging device, and developing device.

In the present embodiment, the present embodiment has been applied to a case where the photoconductor drum 1 (photoconductor), the charging roller 3 (charging device), and the developing device 5 are integrated into the process cartridge 6. Application of the present embodiment is not limited to this case, and it is possible to obviously apply the present embodiment even in a case where each of these members is configured as a unit to be individually attached to and detached from the main body of the image forming apparatus 100 (in a case where no process cartridge is configured). Even in such a case, it is possible to obtain advantageous effects equivalent to the effects of the present embodiment.

In the present application, the "process cartridge" is defined as a unit in which at least one of a charging device that charges a photoconductor and a developing device that develops a latent image formed on the photoconductor and the photoconductor are integrated and detachably installed in the main body of the image forming apparatus.

In the present embodiment, the present embodiment has been applied to the monochrome image forming apparatus 100 in which a toner image is transferred to the sheet P by one image former (process cartridge 6). It is possible to obviously apply the present embodiment to a color image forming apparatus in which a toner image is primarily transferred to an intermediate transfer body such as an intermediate transfer belt by a plurality of image formers, and the toner image is secondarily transferred from the intermediate transfer body to a sheet.

Even in such a case, it is possible to obtain advantageous effects equivalent to the effects of the present embodiment.

According to the present embodiment, it is possible to provide an image forming apparatus and a process cartridge in which occurrence of such a problem that foreign matter such as paper dust leaks to outside of a developing device as time passes by is suppressed when the developing device is caused to function as a cleaning device.

Note that the present disclosure is not limited to the present embodiments and it is apparent that the present embodiments can be appropriately modified within the scope of the technical idea of the present disclosure in addition to what is suggested in the present embodiments. Furthermore, the number, position, shape, and so forth of the constituent members are not limited to the present embodiments, and may be the number, position, shape, and so forth that are suitable for implementing the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:
- a photoconductor;
- a charging device to charge a first surface of the photoconductor; and
- a developing device including:
  - a developing roller to:
    - rotate in one direction while contacting the first surface of the photoconductor; and
    - develop a latent image of toner on the first surface of the photoconductor; and
    - collect the toner adhered to the first surface of the photoconductor; and
  - a supply roller to:
    - rotate in said one direction while contacting a second surface of the developing roller;
    - supply the toner in the developing device to the second surface of the developing roller; and
    - collect foreign matter adhered to the second surface of the developing roller, the foreign matter moved from the first surface of the photoconductor to the second surface of the developing roller, wherein the supply roller includes:
- a shaft; and
- a foamed layer on the shaft. the foamed layer including a foamed resin material having cells with a diameter of 300 μm to 700 μm, the supply roller rotates at a first linear velocity at a portion contacting the developing roller rotating at a second linear velocity at the portion, and a linear velocity ratio of the first linear velocity to the second linear velocity is 1.0to 1.5.

2. The image forming apparatus according to claim 1, wherein the foamed layer includes the cells of continuous bubbles.

3. The image forming apparatus according to claim 1, wherein the supply roller collects the foreign matter having at least paper dust from the developing roller.

4. The image forming apparatus according to claim 1, wherein the developing device further includes:

a developer regulator to regulate an amount of the toner that is supplied from the supply roller to the developing roller and carried onto the second surface of the developing roller; and a scraper to scrape out the foreign matter accumulated at an accumulation position vicinity of the developer regulator away from the accumulation position.

5. The image forming apparatus according to claim 4, wherein the developing device further includes a stirring member including the scraper to stir the toner in the developing device.

6. A process cartridge comprising:

a housing detachably attachable to a main body of an image forming apparatus;

a photoconductor;

a charging device to charge a first surface of the photoconductor; and a developing device including:

a developing roller to:

rotate in one direction while contacting the first surface of the photoconductor; and develop a latent image of toner on the first surface of the photoconductor; and collect the toner adhered to the first surface of the photoconductor; and a supply roller to:

rotate in said one direction while contacting a second surface of the developing roller;

supply the toner in the developing device to the second surface of the developing roller; and collect foreign matter adhered to the second surface of the developing roller, the foreign matter moved from the first surface of the photoconductor to the second surface of the developing roller, wherein the housing accommodates the photoconductor, the charging device, and the developing device, the supply roller includes:

a shaft; and a foamed layer on the shaft, the foamed layer including a foamed resin material having cells with a diameter of 300 μm to 700 μm.

the supply roller rotates at a first linear velocity at a portion contacting the developing roller rotating at a second linear velocity at the portion, and a linear velocity ratio of the first linear velocity to the second linear velocity is 1.0to 1.5.

7. The process cartridge according to claim 6, wherein the foamed layer includes the cells of continuous bubbles.

8. The process cartridge according to claim 6, wherein the supply roller collects the foreign matter having at least paper dust from the developing roller.

9. The process cartridge according to claim 6, wherein the developing device further includes:

a developer regulator to regulate an amount of the toner that is supplied from the supply roller to the developing roller and carried onto the second surface of the developing roller; and a scraper to scrape out the foreign matter accumulated at an accumulation position vicinity of the developer regulator away from the accumulation position.

10. The process cartridge according to claim 9, wherein the developing device further includes a stirring member including the scraper to stir the toner in the developing device.

11. An image forming apparatus comprising:

a photoconductor;

a charging device to charge a first surface of the photoconductor; and a developing device including:

a developing roller to:

rotate in one direction while contacting the first surface of the photoconductor;

develop a latent image of toner on the first surface of the photoconductor; and collect the toner adhered to the first surface of the photoconductor; and a supply roller to:

rotate in said one direction while contacting a second surface of the developing roller;

supply the toner in the developing device to the second surface of the developing roller; and collect foreign matter adhered to the second surface of the developing roller, the foreign matter moved from the first surface of the photoconductor to the second surface of the developing roller;

a developer regulator to regulate an amount of the toner that is supplied from the supply roller to the developing roller and carried onto the second surface of the developing roller; and a scraper to scrape out the foreign matter accumulated at an accumulation position vicinity of the developer regulator away from the accumulation position.

12. The image forming apparatus according to claim 11, wherein the supply roller includes:

a shaft; and a foamed layer on the shaft, the foamed layer comprising a foamed resin material having cells having a diameter of 300 μm or more, the supply roller rotates at a first linear velocity at a portion contacting the developing roller rotating at a second linear velocity at the portion, and a linear velocity ratio of the first linear velocity to the second linear velocity is 1.0 or more.

13. The image forming apparatus according to claim 11, wherein the foamed layer includes the cells of continuous bubbles.

14. The image forming apparatus according to claim 11, wherein the supply roller collects the foreign matter having at least paper dust from the developing roller.

15. The image forming apparatus according to claim 11, wherein the developing device further includes a stirring member including the scraper to stir the toner in the developing device.

* * * * *